United States Patent [19]

Benson et al.

[11] 4,003,023

[45] Jan. 11, 1977

[54] POST-RECOGNITION SEGMENTATION FOR PATTERN-RECOGNITION MACHINES

[75] Inventors: Gary G. Benson; Eugene R. Jones, both of Rochester, Minn.

[73] Assignee: International Business Machines Corporation, Armonk, N.Y.

[22] Filed: July 9, 1975

[21] Appl. No.: 594,387

[52] U.S. Cl. ................ 340/146.3 SG; 340/146.3 H

[51] Int. Cl.$^2$ .......................................... G06K 9/00

[58] Field of Search ........... 340/146.3 SG, 146.3 Z, 340/146.3 H, 146.3 ED; 235/61.11 E

[56] References Cited

UNITED STATES PATENTS

| | | | |
|---|---|---|---|
| 3,160,855 | 12/1964 | Holt | 340/146.3 ED |
| 3,199,080 | 8/1965 | Rabinow et al. | 340/146.3 SG |
| 3,519,990 | 7/1970 | Holt et al. | 340/146.3 SG |
| 3,526,876 | 9/1970 | Baumgartner et al. | 340/146.3 SG |
| 3,694,807 | 9/1972 | Bond et al. | 340/146.3 SG |
| 3,778,597 | 12/1973 | Vanderpool et al. | 340/146.3 Z |
| 3,869,598 | 3/1975 | Englund et al. | 235/61.11 E |

*Primary Examiner*—Leo H. Boudreau
*Attorney, Agent, or Firm*—J. Michael Anglin

[57] ABSTRACT

An optical scanner converts input images into video snapshots which are recognized at fixed intervals, independently of the presence of patterns. Sense generators identify the presence of pattern left and right sides in the snapshots, independently of the recognition unit. A direction detector determines whether the scanner is moving from left to right or vice versa. A composition unit converts the fixed-interval recognitions into a single output code for each input pattern, eliminating duplicate and incorrect data.

8 Claims, 7 Drawing Figures

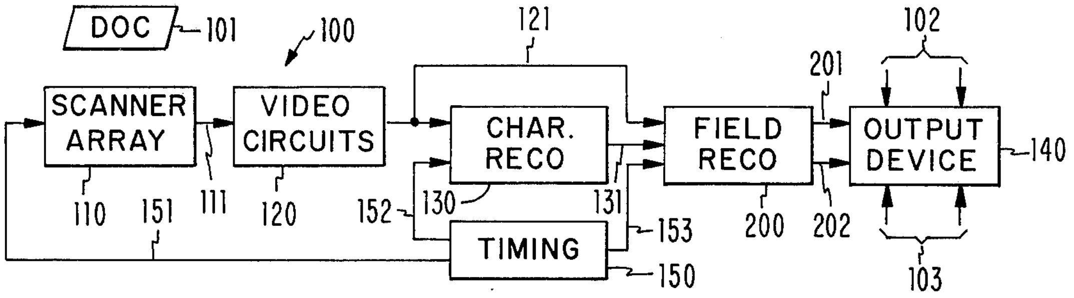
FIG. 1
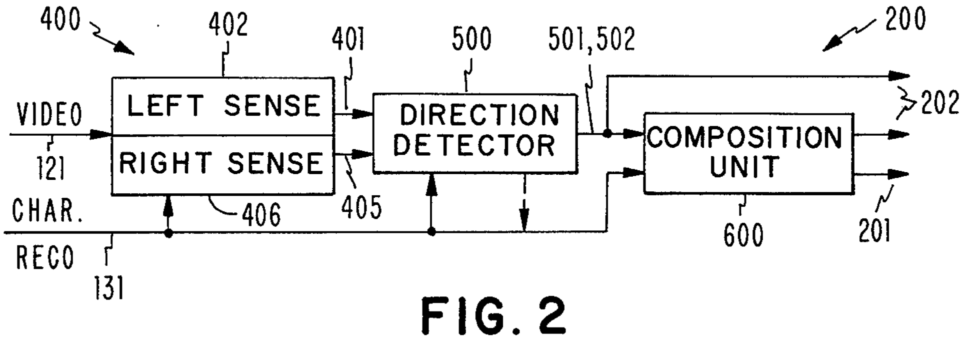
FIG. 2
| | | | | |
|---|---|---|---|---|
| 0 0 + + 0 0 - - 0 0 | 0 0 0 + 0 0 - - 0 0 | 0 0 0 + 0 0 - 0 0 0 | 0 0 0 + + 0 - 0 0 0 | SENSE |
| * * 6 6 6 6 6 * * * | * * * * D D D * * * | Y * * * 2 2 * * * * | * * * * * * * * * * | RECO |
| 6 | D | 2 | * | OUT |
| LR | | | | DIR |
FIG. 3

POST-RECOGNITION SEGMENTATION FOR PATTERN-RECOGNITION MACHINES

BACKGROUND

The present invention concerns patternrecognition machines, and specifically relates to the separation or segmentation of adjacent patterns.

In most electronic character-recognition machines, and in machines for recognizing other types of patterns, some means is required to separate adjacent patterns from each other, so that the recognition unit considers one and only one pattern at a time. Most optical character-recognition (OCR) machines, for example, contain a segmentation unit which detects gaps between characters, for gating an input video image to the recognition circuits. Some conventional OCR machines employ recognition-gated segmentation, in which the output of the recognition unit is gated as soon as this unit has successfully recognized some valid character.

Such conventional machines, however, tend to propagate segmentation errors. For example, a break in the middle of a W will cause at least two recognition errors, such as the gating of two outputs VV. That is, most recognition machines find it difficult to recover from a single segmentation error.

SUMMARY

The present invention proposes to alleviate this and other difficulties by recognizing characters or other patterns before they are segmented from each other. This principle allows much more accurate separation of adjacent characters, because it allows much more information to be used in the segmentation process, and because it inherently minimizes the propagation of errors.

The present invention may be used in conjunction with a recognition unit which classifies input images from a scanner or other sensor at intervals which are independent of the significance or the contents of the images. The intervals may occur at equal time increments, for example; whether a particular image happens to contain one pattern, parts of two patterns or no pattern at all, is of no importance. The invention, broadly speaking, then produces first and second sense signals directly from each input image. These signals indicate whether or not each image contains a left side or a right side, respectively, of something which might be a pattern of interest. A composition unit responsive to the sense signals "composes" the individual results from the recognition unit into a sequence of output codes which correspond to the original patterns. For example, only one output code is produced for a single pattern, no matter how many times the pattern was recognized in different intervals. Also, incorrect recognitions resulting from combinations of two different patterns may be suppressed. As another example, the output-code sequence may be made to represent the correct order of the original patterns, even though they may have been scanned in a backward direction.

These and other features and advantages of the invention, as well as modifications obvious to those skilled in the art, will appear from the following description of a preferred embodiment thereof, taken in conjunction with the accompanying drawings.

DRAWINGS

FIG. 1 illustrates an exemplary environment in which the present invention finds utility.

FIG. 2 shows the interrelation of the major components of the invention.

FIG. 3 is useful in explaining the operation of the invention.

Figure 4:
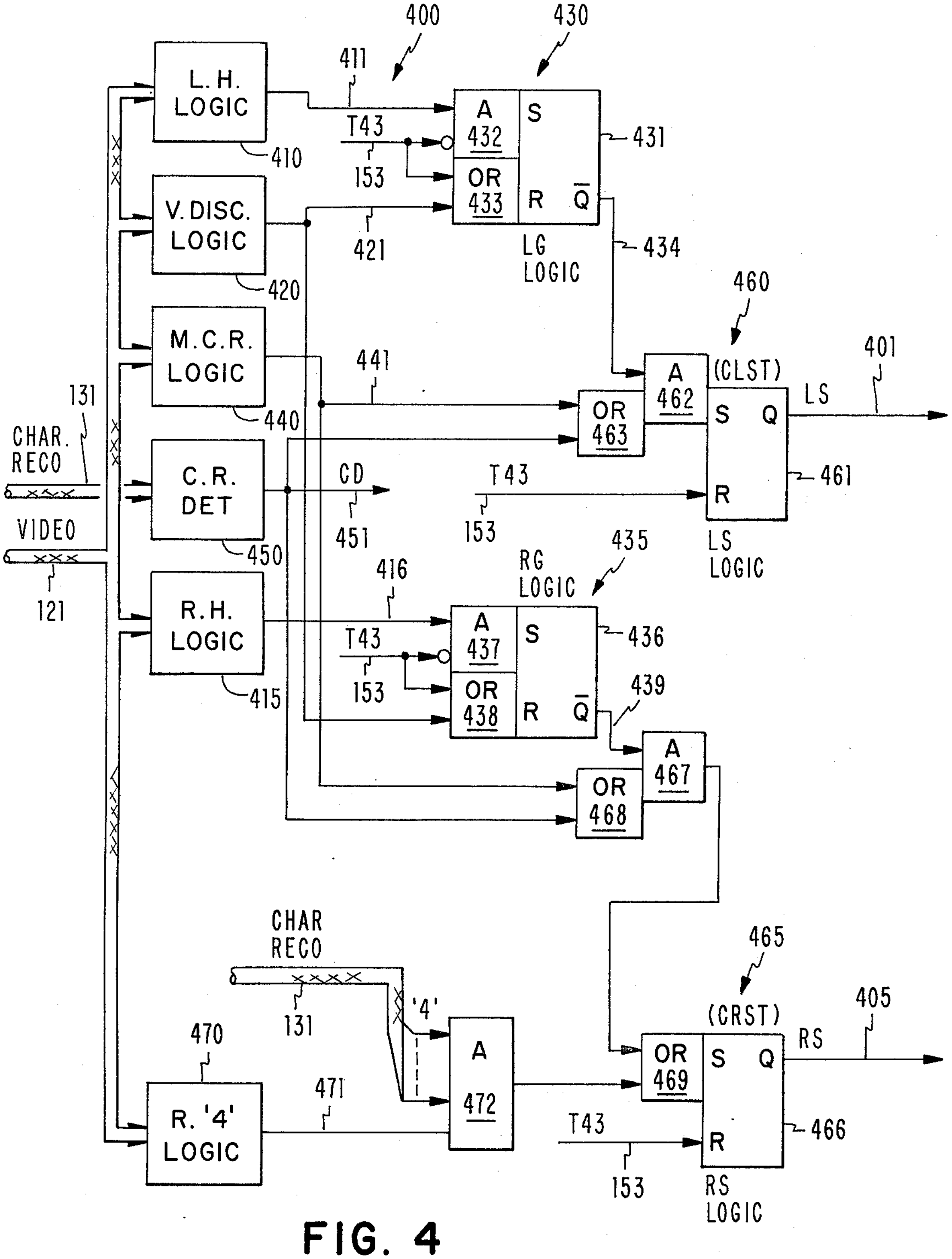
FIG. 4 is a diagram of the sense generators shown generally in FIG. 2.
Figure 4A:
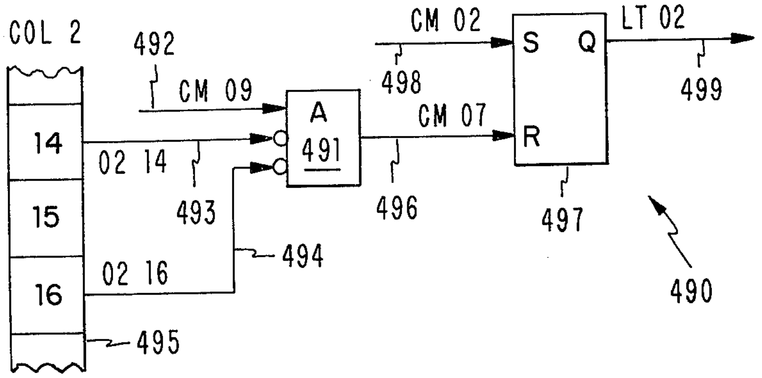

FIG. 4A explains the construction of logic circuits for FIG. 4.

Figure 5:
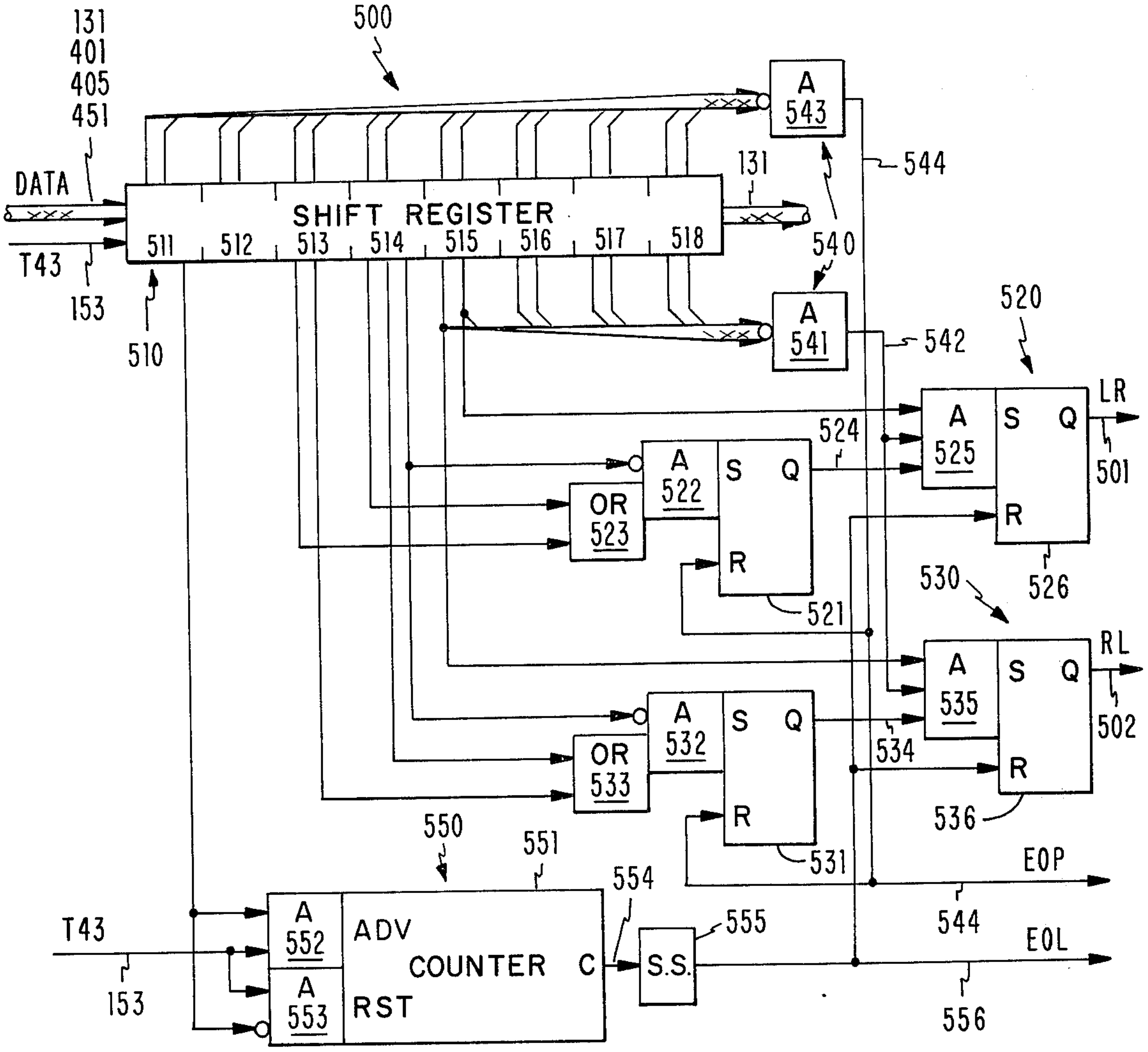

FIG. 5 is a diagram of the direction detector of FIG. 2.

Figure 6:
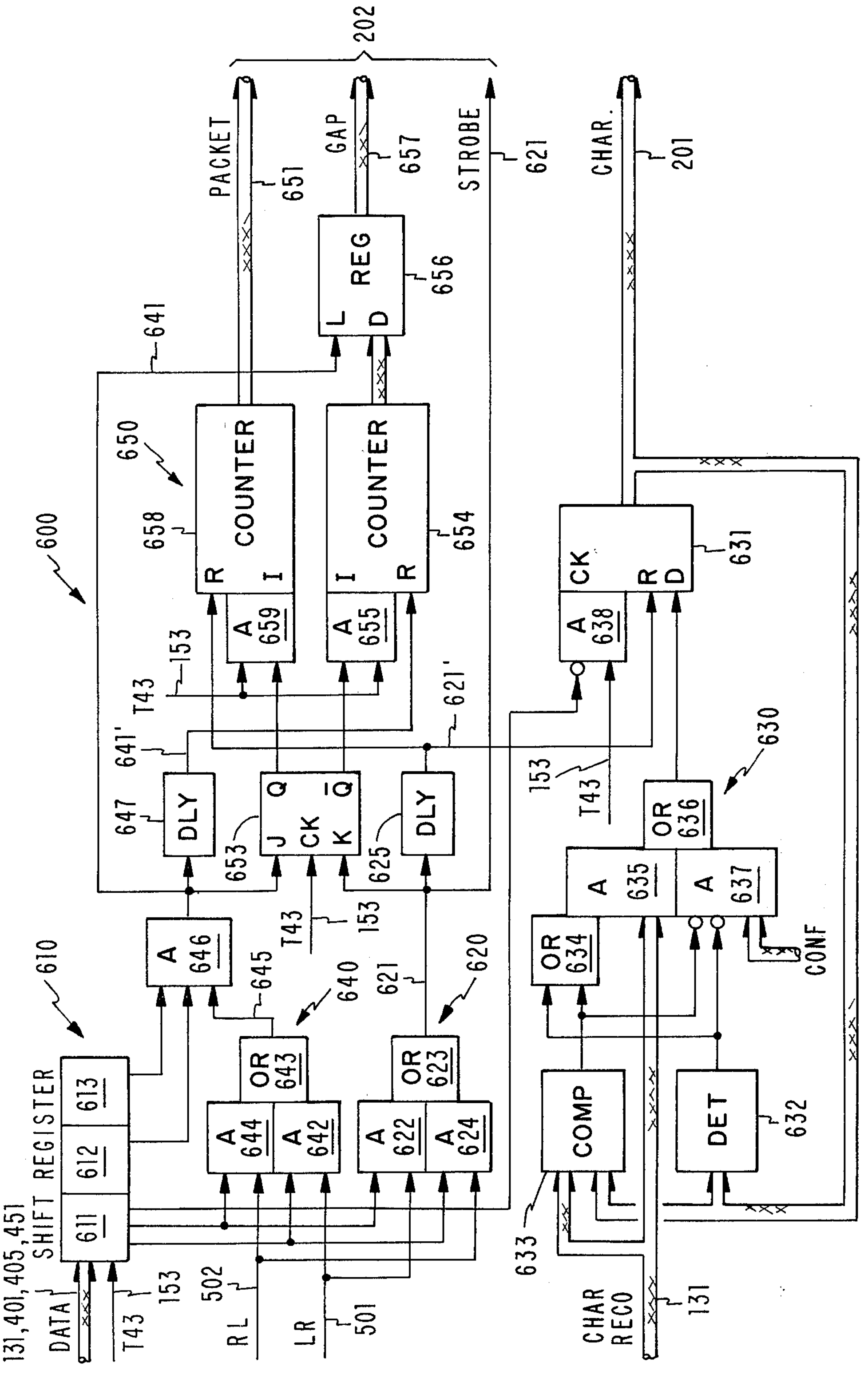

FIG. 6 is a diagram of the composition unit shown in FIG. 2.

DETAILED DESCRIPTION

FIG. 1 shows one of a number of environments in which the present invention finds utility. Reference numeral 100 indicates generally an optical character recognition system. Document 101, containing one or more lines of printed characters, is scanned by a rectangular array 110 of photodiodes whose outputs 111 are read out at fixed time intervals under the control of timing pulses 151. Video circuits 120 convert the analog signals 111 to digitized signals 121 having a first value representing "white" or "background" video from a photodetector; a second value represents "black" or "character" video. Character recognition (CR) unit 130 produces CR codes 131 for every complete scan or "snapshot" of video signals 121, under the control of fixed timing pulses 152. That is, CR unit 130 attempts to identify the contents of every snapshot from array 110 as a character, regardless of the position of array 110 on (or even off of) document 101. When unit 130 cannot recognize any valid character in a snapshot, code 131 assumes a unique "reject" value.

Field recognition (FR) unit 200 receives digitized video signals 121, CR codes 131 and timing signals 153. The overall function of field recognition is to match the sequence of fixed-interval CR codes with the original printed characters on document 101. Unit 200 may, for example, produce a sequence of output recognition codes 201 which eliminate duplicate CR codes representing the same printed character, and cancel incorrect recognitions of pieces of two different characters occurring in the same snapshot. It may also determine whether array 110 is moving across a print line in a forward or backward direction, so that the codes 201 may be reversed for backward scanning. It may also generate auxiliary signals 202 for such purposes as detecting blank spaces on document 101, sensing the end of a line of print, and so forth.

Output device 140 receives signals 201 and 202 for further processing, such as organization into records, readout to display (not shown), and the like. Timing unit 150 may be a conventional source of fixedfrequency pulses for distribution on the aforementioned lines 151–153. For illustrative purposes, scanner array 110 is assumed to have 12 vertical columns each having 40 photodetectors. Timing unit 150 produces repetitive 687-microsecond cycles each having 43 pulses T1-T43 spaced at approximately 16-microsecond intervals. Thus each scan or snapshot contains 12 parallel channels each having 40 16-microsecond samples or cells and 3 "dead" samples for synchronization.

Again by way of example, array 110 and circuits 120 may be contained in a hand-held wand, while units 130, 150 and 200 may be physically located in a point-of-sale terminal. Output device 140 may service a number of different terminals (not shown) as indicated by the additional input signals 102 and 103. FIG. 1 shows a conceptual diagram of the exemplary environment. In actual practice, it may be found desirable to place array 110 and video circuits 120 on the same semiconductor chip, or to combine parts of the functionally separate units 130 and 200. It may also be desirable, e.g., to perform a part of the fieldrecognition function physically within output device 140, so that certain resources may be shared among several terminals. Moreover, other forms of character-recognition machine, and other types of machines as well, may utilize the present invention.

FIG. 2 shows the major components of FR unit 200. Sense generators 400 receive the digitized video 121 and CR codes 131 to produce signals 401 and 405 indicating whether or not the current snapshot contains an approaching or a receding character image. Although many of the circuits are shared, component 400 may be conceptually divided into two parts. Left-sense (LS) generator 402 produces a binary LS signal 401 having a "1" value when the snapshot video 121 contains the left side of some character. Right-sense (RS) generator 406 produces a 1-valued RS signal 405 when the snapshot contains the right side of a character. Obviously, signals 401 and 402 could represent other beginning and terminating aspects of characters or other patterns. For some purposes, it may not be necessary to distinguish between different sides of a pattern, so that a single signal would suffice.

Direction detector 500 analyzes sense bits 401, 405 and CR codes 131 to produce one or more signals 501, 502 indicating whether array 110 is moving from left to right (arbitrarily assumed to be the forward direction) or from right to left (backward) across a line of print on document 101. Signals 501, 502 may be output to device 140 on lines 201 if desired. The dashed line from detector 500 to line 131 indicates that CR codes 131 may actually pass through this component; their significance, however, is not modified therein.

Composition unit 600 employs the sense bits and direction signals to squeeze out redundant and incorrect CR codes 131, so that the output codes 201 do not contain artifacts related to scanner velocity and direction. Unit 600 also outputs some of the previously mentioned auxiliary signals 202.

FIG. 3 is a simplified illustration of the operation of FR unit 200. The uppermost row shows LS and RS sense bits for a sequence of snapshots from scanner 110. A"+" symbol in this row denotes the presence of an LS signal 401, while a "—" denotes an RS signal 405; a "0" indicates that neither signal occurs for the corresponding snapshot. The second row shows the sequence of CR codes generated for the same snapshots; the "*" symbol denotes a reject. The motion of scanner 110 across a print line results in "packets" of multiple CR codes for each character in the line, surrounded by "gaps" of reject codes. (The approximate character areas are shown by the long vertical lines in FIG. 3.) Occasionally, as the Y code in the second row, parts of two adjacent characters may combine with each other to produce a spurious recognition.

The third row of FIG. 3 shows the sequence of output codes 201. That is, the print line contains one "6", one D, one "2" and a truly unrecognizable character. It is also possible that a single packet may contain valid recognitions of two different character classes (e.g., "3" and B) in different snapshots of the same packet; this "conflict" situation will be treated later. In the last row of FIG. 3, the notation LR in the first packet indicates that direction detector 500 has determined that scanner 110 is moving from left to right. That is, the print line on document 101 reads "6D2*", rather than "*2D6". Once set, DIR signal 501 is constant for the remainder of a line.

FIG. 4 is an expanded diagram of sense generators 400. The determination of whether or not a character left side is present in the current snapshot begins with left horizontal (LH) logic 410. This logic is akin to conventional types of horizontal character segmentation logic. More specifically, it analyzes incoming video samples 121 to produce a signal 411 indicating whether or not the current snapshot contains continuous black (i.e., character) video to the left.

Vertical discrimination (VDISC) unit 420 is included because the particular scanner array 110, FIG. 1, is considerably taller than the characters to be recognized. Therefore, VDISC logic 420 produces a signal 421 indicating whether or not the current snapshot contains a horizontal stripe of white video denoting an inter-line gap.

Left gap (LG) logic 430 uses VDISC signal 421 to limit the effect of LH signal 411 to a signal print line, when the current snapshot contains extraneous video above and/or below this line. To this end, signal 411 sets latch 431 through AND gate 432 at any point in the scan cycle except during the T43 time 153, since the lower input of AND 432 is inverted. Latch 431 is reset by VDISC signal 421, or at T43 time in the scan cycle by OR gate 433. Since LG signal 434 is taken from the reset side of latch 431, it signals the presence of a vertical gap between adjacent characters, even when this gap does not extend the full length of the snapshot image.

Minimum character requirement (MCR) logic 440 performs a conventional function of determining whether the current snapshot contains a sufficient amount of black video to indicate the presence of a character. MCR signal 441 is active whenever the snapshot contains more black video than that which might be caused by dirt or smudges in an otherwise white image.

Character recognition detector 450 analyzes output 131 of CR unit 130, FIG. 1 to provide a CD signal 451 whenever CR code 131 is other than a reject.

Left sense (LS) logic 460 produces LS signal 401 whenever a left gap is accompanied by black video which appears to be a character. Latch 461 is set via AND 462 by LG signal 434 when OR 463 receives either MCR signal 441 or CD signal 451, or both. Although signal 441 is usually present whenever signal 451 is active, a small punctuation mark such as a period or colon might not satisfy MCR logic 440, yet would be recognized by CR unit 130. Timing signal T43 resets latch 461 in preparation for the next snapshot.

The generation of RS signal 405, indicating the presence of a character right side, is similar to that for LS signal 401. Right horizontal (RH) logic 415 analyzes incoming video samples 121 to produce a signal 416 denoting whether or not the current snapshot contains continuous black to the right.

Right gap (RG) logic 435 combines RH signal 416, VDISC signal 421 and time-T43 signal 153 in latch 436, AND 437 and OR 438 to produce RG signal 439 in the same manner as that by which LG signal 434 is produced. Logic blocks 466-468 of right sense (RS) logic 465 combine the RG, MCR and CD signals 439, 441, and 451 in the manner described in connection with LS logic 460.

RS unit 465, however, also allows another condition to produce RS signal 405. In the conventional OCR A font, the character "4" does not extend to the full right hand position of the other characters. Accordingly, RIGHT-4 (R4) logic 470 is specifically tuned to produce an R4 signal 471 when the current snapshot contains the right side of a "4" followed by a gap. When the R4 signal coincides with the presence of a CR code for a "4" on line 131, AND 472 sets latch 466 of RS logic 465 via OR 469 to produce RS signal 405. In this way, a special case may be included without undue complexity in the general-purpose circuits 415 and 435. Obviously, this principle may be extended to include other individual characters or groups of characters, and it may be applied to the left sides of characters as well as to their right sides. It is envisaged, for example, that this feature may be useful to compensate for rotated characters caused by azimuthal misalignment of scanner 110 with a line of print on document 101.

The individual blocks shown in FIG. 4 represent functional units known in the art. Depending upon the particular environment in which sense generators 400 are employed, it may be desirable to combine them to a greater or lesser extent. For example, circuits 410, 430 and 460 are used only by LS generator 401 as shown in FIG. 2, while circuits 415, 435, 465 and 470 belong only to RS generator 406. But the blocks 420, 440 and 450 are shared by both generators. In addition, it may be desirable to place generator circuits 400 on a large-scale integrated (LSI) chip along with some or all of the circuits for CR unit 130, so that some intermediate signals may be used by both of these functionally separate units.

To illustrate the details of one particular embodiment, Table 1 hereinbelow is a specification of LSI logic circuits for both sense generators 400 and CR unit 130. The left hand column of Table 1 contains the names of various signals and comments. The center column contains specifications of the logics named in the left column. In the center column, individual terms are separated by a period (denoting an "AND" logic operation), an ampersand (denoting an "OR" logic operation), or a pair of parentheses (denoting an "AND" operation on the results of the terms enclosed in the parentheses). A left parenthesis is implied at the beginning of each logic specification. A logic operator or a pair of opposing parentheses at the end of any line continues that specification into the succeeding line. The right hand column of Table 1 is merely a set of serial numbers for the specifications.

For signals which employ only combinatorial logic, each term in the center column of Table 1 first contains either a"0" or a "1" to denote whether or not it is inverted. If the remainder of a term is a pair of numbers, the first number represents one of the twelve columns of scanner array 110, while the second number is the ordinal number of a shift register stage for that column. For example, the term "1 02 15" indicates a signal representing uninverted (black, or binary 1) video in the fifteenth stage of the shift register for scanner column 2. A term specification such as "1 CM 05" in the center column of Table 1 indicates that the true form (1) of the previously generated signal CM 05 is to be used for that term. Latches are designated by signal names beginning with LT in the left column of Table 1, and contain both set and reset conditions. Signal LT 01, eg, is set by the signal "1 CM 01", and is reset (R) by the signal "1 CM 07". FIG. 4A illustrates the conversion of the Table 1 specifications into integrable logic circuits 490. Signal CM 07, eg, is produced by an AND gate 491 having 3 inputs. True input 492 receives intermediate signals CM 09, generated by previous circuits. Inverting input 493 receives a video signal 02 14 from the 14th stage of a shift register 495 carrying signals from column 2 of scanner 110, FIG. 1. Inverting input 494 receives a signal from the sixteenth stage of register 495. Output 496 carries the resulting CM 07 signal to the reset input of latch 497, which produces the LT 02 signal on line 499. The set input 498 of latch 497 is energized by another intermediate signal, CM 02. The remaining circuits specified by Table 1 are constructed in a similar manner. The final outputs of Table 1 are the CLST and CRST signals, which are the "set" inputs of latches 461 and 466, FIG. 4, respectively.

FIG. 5 is a block diagram of direction detector 500, shown generally in FIG. 2. A parallel shift register 510 having stages 511–518 receives sense signals 401 and 405 and an inverted form, —CD, of signal 451. That is, a high level of signal —CD indicates that CR unit 130, FIG. 1, has produced a reject code 131 for the current snapshot. The codes 131 themselves may also be propogated through register 510 purely for delay purposes, so that a direction signal 501 or 502 may be generated for a print line before the first character of that line is analyzed by composition unit 600. To avoid unnecessary complication of the description, particular outputs from each stage of register 510 will be denoted by the stage number followed by a symbol L, R, or * respectively denoting the LS signal 401, RS signal 405, or the —CD signal 451 from that particular stage. For example, a designation "511*" specifies the the —CD bit in stage 511, while "518R" specifies the the RS signal contained in stage 518. Register 510 is shifted by T43-time signal 153.

Turning to the other major components of detector 500, left-to-right (LR) detector 520 combines certain outputs of register 510 to produce LR signal 501, while right-to-left detector 530 produces RL signal 502. Packet detector 540 and end-of-line (EOL) detector 550 produce signals employed by detectors 520 and 530 as well as by other units to be described hereinbelow.

Within packet detector 540, AND 541 is connected to outputs 515L-518L and 515R-518R to produce a signal 542 when none of the snapshots represented by stages 515–518 contains a sense signal. AND 543 responds to shift-register outputs 511L-518L and 511R-518R to produce an end-of-packet (EOP) signal 544, indicating that none of the stages 511-518 contains a sense bit. The conditions under which signals 542 and 544 are produced may of course be made more elaborate or dynamically variable.

End-of-line (EOL) detector 550 identifies a string of consecutive reject codes which is longer than any possible inter-character gap in a single print line at the slowest scanning speed. Since such a string is much longer than the number of stages in shift register 510, EOL detector 550 employs a 7-stage counter 551. This counter is advanced by register output 511* in synchronism with register 510, by means of T43 timing signal 153, via AND gate 552. In order to record only consecutive rejects, AND 553 resets counter 551. to zero for any snapshot in which signal 511* is false. When counter 551 overflows after 128 consecutive rejects, its carry output 554 activates signal shot 555 to produce EOL signal 556.

LR generator 520 is enabled during each packet to recognize LS signals to the immediate left of a non-reject character and RS signals to its right. More specifically, latch 521 is set by AND 522 when register output 514* is false, if OR 523 receives at least one LS signal 513L or 514L. EOP signal 544 resets latch 521 after every packet as previously defined. Therefore, latch output 524 is active for the remainder of any packet which has an LS signal either in the snapshot containing a recognizable character or in the snapshot immediately to its left. This condition enables AND 525 to set latch 526 when, later in the same packet, a snapshot having an RS signal 515R is followed to the right by snapshots having no sense bits, signal 542. LR signal 501 then stays active until latch 526 is reset by EOL signal 556 at the end of a print line.

RL generator 530 operates in a similar manner but employs opposite sense bits. Latch 531 is set by inverted signal 514* in conjunction with either of the signals 513R or 514R, via AND 532 and OR 533. EOP signal 544 resets latch 531 between every packet. Latch output 534 enables AND 535 to recognize an LS signal 515L followed by successive frames having no sense bits, signals 542. Once set, latch 536 produces RL signal 502 until reset by EOL signal 556.

FIG. 6 shows the details of a composition unit 600, as indicated generally in FIG. 2. The primary purpose of this unit is to convert an incoming stream of CR codes 131 into a sequence having only a single code for each character in a line of print, eliminating all redundant and incorrect codes. This function is performed by shift register 610, gating 620 and discriminator 630.

Shift register 610 receives the LS, RS and —CD signals from register 510, FIG. 5, and is also clocked by a T43 timing signal 153. In fact, register 610 may simply be an extension or a part of register 510 if desired. Although register 610 has three stages 611–613, only the first stage 611 is used for the primary composition function.

Gating logic 620 combines the LS and RS outputs 611L and 611R from register stage 611 with the LR and RL direction signals 501 and 502. Logic 620 produces an end-of-character (EOC) signal 621, which also has a delayed form 621'. Since a right side ends a character in a left-to-right scan, LR signal 501 enables AND 622 and OR 623 to produce EOC signal 621 when register output 611R becomes active. Contrariwise, RL signal 502 enables AND 624 and OR 623 when the LS signal 611L comes up. EOC signal 621 is used directly as a strobe to output device 140, FIG. 1; delay unit 625 produces a delayed version 621' for other purposes to be described.

Discriminator 630 is central to the composition unit 600. During inter-packet gaps, latch 631 is held at to the reject CR code by EOC signal 621'. This is most conveniently accomplished by defining the reject code as having all zeros, and inputting signal 621' to an overriding-reset terminal. The output code 201 held in latch 631 is fed back to reject-code detector 632 and to code comparator 633. The latter element also receives the current CR code 131 from unit 130, preferably delayed in time by shift register 510, FIG. 5. When latch 631 contains a reject code, as at the beginning of a packet after signal 621' becomes inactive, detector 632 causes OR 634 to enable AND 635 to present the currentsnapshot CR code 131 to latch 631 via OR 636. The same operation occurs when OR 634 receives a signal from comparator 633 indicating that CR code 131 represents the same character as that of output code 201 in latch 631. But, when code 201 is neither the reject code nor the same as CR code 131, AND 637 presents a predetermined "conflict" code through OR 636 to latch 631. This latter code indicates that a single printed character cannot be uniquely identified, since it has passed a recognition criteria for two or more different character classes.

A T43 timing signal 153 clocks the code from OR 636 into latch 631 once for every snapshot, except when disabled by AND 638. This latter gate is disabled by signal 611*, so that a reject signal following a valid recognition signal in the same packet does not destroy the effect of that valid recognition. At every snapshot within a packet, then, latch 631 may retain its previous contents or may be loaded with a CR code from the current snapshot or a conflict code. At the end of a packet, EOC signal 621 may be sent out as a strobe to cause output device 140, FIG. 1 to load output code 201. The delayed EOC 621' then resets latch 631 to the reject code for the next packet. In this way, composition unit 600 releases one and only one output code for each packet of snapshots from scanner 110. If CR unit 130 has not recognized any valid character during this interval, signal 201 will still have its original reject setting. If only a single valid character class has been identified, its code will be released. If more than one valid class has been found, a conflict code is set and held, since comparator 633 will no longer allow any CR code (except another conflict to be entered into latch 631. Once a valid character has been recognized in any snapshot, a subsequent reject in that packet will not destroy the effect of the recognition.

Obviously, other forms of gating logic may achieve the same or similar results. More elaborate conditions may be used if justified by the added expense. It may be worthwhile in some systems, for example, to require a valid CR code 131 in more than one snapshot in each packet in order to remove the reject code from latch 631. It might also be desirable, for example, to include a voting function for different valid CR codes in the same packet, rather than merely setting a conflict code. Other modifications will also appear to those skilled in the art.

The circuits shown in FIG. 6 transmit one output code 201 from each packet directly to output device 140, FIG. 1. Another function which may be conceptually included in the term "field recognition", as described in FIG. 1, is that of reversing the order of output codes 201 for a print line on document 101 when scanning has been performed backwardly across the print line, so that output device always sees a sequence of codes as though the scanning had occurred in a forward direction. This function may be accomplished by additional circuits responsive to signals 201, 501, 502, 556 and 621. In the exemplary system 100, output device 140 may be a programmable data processor coupled to multiple low-speed scanning and recognition units. In this context, it may be more economical to provide line reversal by programming in device 140, especially since this device must in any case contain buffers and a data-collection routine. The extra overhead in providing line reversal then becomes minimal. Table 2 hereinbelow shows how this function may be accomplished. The signals received by this routine are RL 521, EOL 546, STROBE 621 and CHAR 201. BUFFER represents the address of the beginning of a 256-character buffer area in storage; ADDRESS is a pointer to a current location in the buffer. At the conclusion of the routine, the pointers FIRST and LAST are the buffer addresses of the first and last addresses in the line, for use by another arbitrary routine. That is, ascending addresses in the buffer represent a forward scan regardless of the direction in which the original scan was carried out.

Composition unit 600 also includes auxiliary circuits 640 and 650 for deriving signals 651 and 656 representing the number of snapshots in each packet and in the gaps between adjacent packets.

Gating circuits 640 produce signals 641 and 641′ for defining the beginning of each packet as a snapshot having a sense bit to the left of two reject snapshots. For a print line scan from left to right, LR signal 501 enables AND 642 to transmit an LS bit 611L through OR 643. For the opposite direction, RL signal 502 enables AND 644 to pass an RS bit 611R. The resulting signal 645 then enables AND 646 to produce packet-start (PS) signal 641 when the two reject signals 612* and 613* occur to the right. Conventional delay unit 647 produces delayed PS signal 641′.

In tally circuit 650, EOC signal 621 resets latch 653, thus enabling 654, through AND 655, to increment once for every T43 timing signal 153. At the beginning of the next packet, PS signal 641 loads the counter contents into register 656; delayed PS signal 641′ then resets counter 654. PS signal 641 also sets latch 653, which enables counter 658, via AND 659, to advance for every T43 signal. When EOC signal 621 next comes up, signal 651 indicates the number of snapshots within the packet, while signal 657 represents the number of snapshots in the preceding inter-packet gap. Signal 621 strobes out these signals before delayed EOC signal 621′ resets counter 658. The packet and gap signals may be transmitted to additional composition circuits (not shown) or to output device 140 for various purposes. They may be employed, for example, to recognize blank spaces in the print line when the gap count exceeds the packet count by a predetermined margin. Such a determination may be used to separate words or fields in an input record. Moreover, character recognition may be verified by excluding very narrow packets as being probably erroneous. Many other uses will be obvious to those skilled in the art. The point is that composition unit 600, by separating characters after their identification rather than before, provides considerably more information about the entire history of a print line, and therefore better overall analysis of the line.

Having described an embodiment thereof, I claim as my invention:

1. Apparatus for separating adjacent patterns in a system having a pattern-recognition unit responsive to pattern input signals for producing recognition codes at intervals which are substantially independent of the occurrences of said adjacent patterns, said apparatus comprising:

first sense generator means for combining a plurality of said pattern signals so as to produce a left-sense signal indicative of the occurrence of a first side of a potential pattern;

second sense generator means for combining a plurality of said pattern signals so as to produce a right-sense signal indicative of the occurrence of a right side of a potential pattern; and composition means responsive to said left-sense signal, said right-sense signal and said recognition codes for producing a single output code for each of said adjacent patterns, regardless of the number of said recognition codes produced for said patterns, said composition means including gating means responsive to a plurality of said sense signals for producing start and end signals respectively representing the beginning and the end of each of said adjacent patterns and discriminator means responsive to said start and end signals for selectively storing said recognition codes and for releasing one of said stored recognition codes as said output code, wherein said discriminator means is adapted to store a reject code when said start signal is active, and to store a current one of said recognition codes when said stored code is said reject code.

2. The apparatus of claim 1, wherein said discriminator means is further adapted to store a conflict code when both said stored code is not said reject code and said current one recognition code differs from said stored code.

3. The apparatus of claim 1, wherein said discriminator means is further adapted to inhibit storage of said current one recognition code when both said current one recognition code is said reject code and said stored code is not said reject code.

4. Apparatus for separating adjacent patterns in a system having a pattern-recognition unit responsive to pattern input signals for producing recognition codes at intervals which are substantially independent of the occurrences of said adjacent patterns, said apparatus comprising:

first sense generator means for combining a plurality of the same pattern signals so as to produce a left-sense signal indicative of the occurrence of a first side of a potential pattern;

second sense generator means for combining a plurality of the same pattern signals so as to produce a right-sense signal indicative of the occurrence of a right side of a potential pattern;

direction detector means responsive to said sense signals for producing direction signals representing the order of said adjacent patterns; and composition means responsive to said left-sense signal, said right-sense signal and said recognition codes for producing a single output code for each of said adjacent patterns, regardless of the number of said recognition codes produced for said patterns, said composition means being further responsive to said direction signal for producing said output code for each of said patterns.

5. The apparatus of claim 4, wherein said direction detector comprises:

packet detector means for producing a signal indicative of a predetermined combination of said sense signals; and at least one direction means responsive to said sense signals and to said packet signal for producing and storing at least one of said direction signals.

6. The apparatus of claim 4, wherein said direction detector further comprises and end-of-line detector responsive to a predetermined sequence of said recognition codes for resetting said direction generator.

7. The apparatus of claim 4, wherein said composition means comprises:

gating means responsive both to said sense signals and to said direction signals for producing start and end signals representing the beginning and the end of each of said adjacent patterns; and discriminator means responsive to said start and end signals for selectively storing said recognition codes and for releasing one of said stored recognition codes as said output code.

8. The apparatus of claim 4, further comprising means responsive to said direction signal for selectively reversing the order of each said output code, so as to produce a sequence of codes representing the order of said adjacent patterns, regardless of the order of said recognition codes.

* * * * *

UNITED STATES PATENT AND TRADEMARK OFFICE
CERTIFICATE OF CORRECTION

PATENT NO. : 4,003,023

DATED : January 11, 1977

INVENTOR(S) : Gary G. Benson, et al

It is certified that error appears in the above—identified patent and that said Letters Patent is hereby corrected as shown below:

The attached columns 13 thru 30 should be added as part of the above-identified patent.

Signed and Sealed this

*Eleventh* Day of *November 1980*

[SEAL]

*Attest:*

SIDNEY A. DIAMOND

*Attesting Officer* *Commissioner of Patents and Trademarks*

TABLE 1

```
                    1 06 13 & 1 06 14 & 1 06 15 )(                              LV-60546
M1                  1 03 12 & 1 04 12 & 1 11 10 . 0 11 12 . 0 11 13 )(          LV-60547
T1                  1 09 01 & 1 09 02 & 1 09 03 )(                              LV-60548
                    1 02 04 & 1 02 03 )                                         LV-60549
B1                                                                              LV-60550
* EIGHT 2                                                                       LV-60551
R802 BL             0 06 06 . 0 06 05 )(                                        LV-60552
B2                  1 05 01 & 1 06 02 & 1 06 03 )(                              LV-60553
                    1 09 04 & 1 10 04 & 1 11 04 )(                              LV-60554
M1                  1 03 10 & 1 04 10 )(                                        LV-60555
K                   0 02 01 )(                                                  LV-60556
T1                  0 10 11 . 0 10 12 . 0 10 13 . 0 10 14 . 0 10 15 )(          LV-60557
M3                  1 08 12 & 1 09 12 )(                                        LV-60558
T1                  1 03 12 & 1 04 12 )(                                        LV-60559
M3                  1 06 07 & 1 08 08 )(                                        LV-60560
M1                  1 06 13 & 1 06 14 & 1 06 15 )(                              LV-60561
                    1 02 06 & 1 03 06 )(                                        LV-60562
                    1 06 07 & 1 06 08 )(                                        LV-60563
HELP MISS R'S       1 10 07 & 1 10 08 )(                                        LV-60564
                    1 08 13 & 1 08 14 & 1 08 15 )(                              LV-60565
                    1 09 01 & 1 09 02 & 1 09 03 )(                              LV-60566
B1                  1 02 04 & 1 03 04 ) .                                       LV-60567
* NINE 1                                                                        LV-60568
R901 BL             1 10 03 & 1 11 03 )(                                        LV-60569
T1                  1 03 13 & 1 03 14 & 1 03 15 )(                              LV-60570
M2                  1 05 09 & 1 06 10 )(                                        LV-60571
K                   0 02 06 . 0 03 06 )(0 05 12 & 0 06 11 )(                    LV-60572
M3                  1 10 11 & 1 11 11 )(                                        LV-6057
T2                  1 06 13 & 1 06 14 & 1 06 15 )(                              LV-60574
M1                  1 02 11 & 1 03 11 )(                                        LV-60575
R3                  1 10 06 & 1 11 06 )(                                        LV-60576
R2                  0 06 01 . 0 06 02 . 0 05 03 . 0 06 04 . 0 06 05 .           LV-60577
                    0 05 06 )(                                                  LV-60578
1                   0 02 03 . 0 03 03 . 0 04 03 )(                              LV-60579
T  4'S              1 08 14 & 1 08 15 & 1 08 13 )(                              LV-60580
B1                  0 04 01 . 0 04 02 . 0 04 03 . 0 04 04 . 0 04 05 .           LV-60581
                    0 04 06 )(                                                  LV-60582
M                   1 06 09 & 1 08 10 )(                                        LV-6058
R'S NO LWR LEFT     1 10 08 & 1 11 07 )(0 08 07 & 0 06 08 )(                    LV-60584
T1                  0 01 16 . 0 02 16 . 0 03 16 . 0 04 16 . 0 05 16 )           LV-60585
LTUM                1 CU 01 & 1 CM 05 )                                         ULV-60586
RU01                1 LT 08 . 1 CM 11 )                                         LV-60587
TREF                1 RA 01 & 1 RN 01 & 1 RD 01 & 1 RP 01 & 1 RK 01 &           LV-60588
                    1 RB 01 & 1 RC 01 & 1 RM 01 & 1 RU 01 & 1 RX 01 &           LV-60589
                    1 RY 01 & 1 RZ 01 & 1 R0 01 & 1 R> 01 & 1 RC 01 &           LV-60590
                    1 R1 01 & 1 R2 01 & 1 R3 01 & 1 R4 01 & 1 R5 01 &           LV-6059
                    1 R6 01 & 1 R7 01 & 1 R8 01 & 1 R9 01 & 1 R4 02 &           LV-6059
                    1 R5 02 & 1 R7 02 & 1 R8 02 & 1 R. 01 )                     LV-6059
                    1 TR FF . 0 LT 01 )                                         LV-6059
CLS2                1 TR FF . 0 LT 04 & 1 R4 01 . 0 LT 03 )                     LV-6059
CRS2                1 CL S1 & 1 CL S2 )                                         LV-6059
CLST                1 CR S1 & 1 CR S2 )                                         LV-6059
CRST                1 LT S1 )(1 CL ST & 1 CR ST )                               SLV-6059
CMSL                1 CM SL )                                                   S_V-6059
LTS2                1 LT S2 . 1 CM 11 )                                         SLV-6059
CMSC                                                                            LV-6060
SET CLST 01                                                                     LV-6060
SET CRST 02                                                                     LV-6060
SET CLS2 03                                                                     LV-6060
SET CRS2 04                                                                     LV-6060
SET CMSC 05         START CONDITION INDICATOR IS SET
```

IBM 37

```
K                      C 06 11 & 1 09 10 & C 06 08 )(                         LV-604
M1                     1 04 09 & 1 04 10 )(                                   LV-604
B1                     1 03 03 & 1 03 04 & 1 03 05 )(                         LV-604
                       0 03 07 . 0 04 07 )(0 05 07 )(                         LV-604
M2                     1 06 09 & 1 06 10 )(                                   LV-604
T3                     1 09 15 & 1 09 16 )(                                   LV-604
M3                     1 10 09 & 1 11 09 )(                                   LV-604
T3                     C 08 13 . C 09 13 . C 10 13 . 0 11 13 )(               LV-604
M1                     C 02 07 . C 02 08 . 0 02 09 )(                         LV-604
M1                     1 06 03 & 1 06 04 & 1 06 05 )(                         LV-604
K BETWEEN PACKET       C 07 01 & 0 07 04 &                                    LV-604
                       C 12 14 . C 12 15 . 0 12 16 )(0 06 07 )(               LV-604
OPEN 8'S & R'S         C 04 06 . C 06 06 & 1 11 15 . 1 09 04 )(               LV-604
M1                     1 03 12 & 1 04 12 )                                    LV-604
* SIX 1                                                                       LV-604
R601 BL                1 10 05 & 1 11 05 )(                                   LV-604
T1                     1 02 14 & 1 03 14 )(                                   LV-604
M1                     1 02 06 & 1 03 05 )(                                   LV-604
                       1 06 03 & 1 06 04 )(0 06 05 & 0 05 06 )(               LV-604
M2                     1 05 07 & 1 06 06 )(                                   LV-604
                       1 04 07 & 1 04 08 )( .                                 LV-604
M2                     C 06 11 . C 09 11 . 0 10 11 . 0 11 11 )(               LV-604
M1                     1 02 11 & 1 03 11 )(                                   LV-604
K     1'S AT 10        C 03 06 & 1 02 05 . 1 02 07 )(                         LV-604
                       C 06 11 .                                              LV-604
K                      C 06 12 . 0 06 13 . C 08 14 . 0 08 15 . 0 08 16 )(     LV-604
B2                     1 08 03 & 1 08 04 )(                                   LV-604
M3                     1 08 07 & 1 09 08 )(                                   LV-604
T3                     C 08 13 . C 09 13 . C 10 13 . 0 11 13 )(               LV-604
                       1 01 13 . 1 01 15 & 0 04 09 . C 04 11 . 1 04 07 &      LV-604
                       C 06 14 . C 06 15 . 0 08 16 )(                         LV-604
                       C 04 01 . C 06 01 . C 08 01 . 0 09 01 .                LV-604
K                      C 02 01 . C 03 01 . C 10 01 . 0 11 01 )                LV-605
* SEVEN 1                                                                     LV-605
R701 BL                1 06 06 . 1 06 06 )(                                   LV-605
M3                     1 10 11 & 1 11 11 )(                                   LV-605
T1                     1 03 13 & 1 03 14 & 1 03 15 )(                         LV-605
                       C 06 10 . 0 06 11 . 0 09 12 )(                         LV-605
                       1 08 13 & 1 08 14 & 1 08 15 )(                         LV-605
                       C 10 01 . C 10 02 . C 10 03 . 0 10 04 )(               LV-605
                       C 03 01 . 0 03 02 . 0 03 03 . C 03 04 . 0 03 05 .      LV-605
                       C 03 06 )(                                             LV-605
                       1 06 13 & 1 06 14 & 1 06 15 )(                         LV-605
M1                     C 02 11 . C 03 11 . 0 04 11 )(                         LV-605
M1                     C 02 07 . C 02 08 . 0 02 09 )(                         LV-605
D UP LEFT OPEN&BOT     0 06 08 & 0 10 08 )(                                   LV-605
M3                     1 08 07 & 1 08 08 )                                    LV-605
* SEVEN 2                                                                     LV-605
R702 BL                1 06 03 & 1 06 02 )(1 06 06 & 1 08 05 )(               LV-605
M3                     1 10 11 & 1 11 11 )(                                   LV-605
T1                     1 03 14 & 1 03 15 & 1 03 13 )(                         LV-605
CK 0'S WITH NOISE      1 11 14 & 1 06 04 )(                                   LV-605
T2                     1 10 06 & 1 11 09 )(                                   LV-605
K     X'S AT 10        C 12 15 . C 11 07 )(                                   LV-605
K                      C 05 10 . C 06 11 )(0 08 10 )(                         LV-605
T                      1 05 13 & 1 08 14 & 1 08 13 )(                         LV-605
B3                     C 10 01 . C 10 02 . 0 10 03 . 0 10 04 )(               LV-605
B1                     C 04 01 . C 04 02 . 0 04 03 . 0 04 04 . 0 04 05 .      LV-605
                       C 04 06 )(                                             LV-605
T2                     1 06 13 & 1 06 14 & 1 06 15 )(                         LV-605
M1                     C 02 10 . C 03 10 . C 04 10 )(                         LV-605
M1                     C 02 07 . 0 02 08 . 0 02 09 )(                         LV-605
 NO LWR LEFT ON R      C 04 07 . C 04 08 . 0 04 09 )(                         LV-605
M3                     1 08 07 & 1 08 08 )                                    LV-605
* EIGHT 1                                                                     LV-605
R801 BL                C 05 05 . C 06 05 )(1 02 06 )(                         LV-605
B2                     1 06 01 & 1 06 02 & 1 06 03 )(                         LV-605
M3                     1 10 05 & 1 11 05 & 1 09 05 )(                         LV-605
K     F'S              C 11 10 . C 11 12 . 0 11 13 & 1 06 10 )(               LV-605
K                      1 02 07 & 1 08 12 )(                                   LV-605
T1                     C 02 11 . C 02 12 . 0 02 13 . 0 02 14 . 0 02 15 .      LV-605
                       C 02 16 )(                                             LV-605
A'S                    1 04 14 & C 06 11 & 1 09 14 )(                         LV-605
M3                     1 08 11 & 1 09 11 &                                    LV-605
5'S                    C 10 14 . C 10 15 .                                    LV-605
                       C 03 06 . C 06 12 . 0 02 09 . 1 07 15 )(               LV-605
M3                     1 08 07 & 1 09 08 )(                                   LV-605
                       1 04 07 & 1 04 05 )(                                   LV-605
```

```
M3                    1 12 04 & 1 11 09 )(                                LV-60390
OPEN 8'S              0 09 07 . 0 10 07 . 0 11 07 & 1 02 14 )(            LV-60391
B                     0 08 05 . 0 09 05 . 0 10 05 . 0 11 05 )(            LV-60392
M1                    1 02 06 & 1 03 07 )                                 LV-60393
* THREE 1                                                                 LV-60394
R301 BL               1 10 05 & 1 11 05 & 1 09 05 )(                      LV-60395
T1                    1 03 13 & 1 03 14 & 1 03 15 )(                      LV-60396
K2                    1 06 08 & 1 06 07 )(                                LV-60397
T1                    0 02 11 . 0 03 11 . 0 04 11 )(0 06 11 )(            LV-60398
T3                    1 10 11 & 1 11 11 & 1 09 11 )(                      LV-60399
B1                    1 03 01 & 1 03 02 & 1 03 03 )(                      LV-60400
B1                    0 02 05 . 0 03 05 . 0 04 05 )(                      LV-60401
M1                    1 04 07 & 1 04 08 & 1 04 09 & 0 08 05 . 0 06 05 .   LV-60402
                      0 08 11 )(                                          LV-60403
M3                    1 08 07 & 1 08 08 & 1 08 09 )(                      LV-60404
5'S WITH NS UP LFT    1 10 09 & 1 11 09 & 1 09 09 )(                      LV-60405
B2                    1 06 01 & 1 06 02 & 1 06 03 )(                      LV-60406
T3                    1 08 13 & 1 08 14 & 1 08 15 )(                      LV-60407
M1                    0 02 07 . 0 02 08 . 0 02 09 )                       LV-60408
* FOUR 1                                                                  LV-60409
R401 BL               1 10 11 & 1 09 11 )(                                LV-60410
T1                    1 03 12 & 1 04 12 )(                                LV-60411
T1                    1 02 14 & 1 03 14 & 1 04 14 )(                      LV-60412
K                     1 09 07 & 1 10 08 )(                                LV-60413
M1                    0 02 07 . 0 02 08 . 0 02 09 & 0 LT 01 .             LV-60414
T1                    0 01 16 . 0 02 16 . 0 03 16 . 0 04 16 . 0 05 16 )(  LV-60415
B3                    1 11 03 & 1 09 03 & 1 10 03 )(                      LV-60416
B1                    0 02 05 . 0 03 05 . 0 04 05 )(                      LV-60417
M1                    1 04 07 & 1 04 08 )(                                LV-60418
K     FOR N'S AT 10   0 09 15 . 0 10 15 . 0 11 15 . 0 12 15 )(            LV-60419
K     V'S AT -10      0 06 04 )(                                          LV-60420
M2                    1 06 06 & 1 06 07 )(                                LV-60421
T3                    0 08 12 . 0 08 13 . 0 08 14 . 0 08 15 . 0 08 16 )(  LV-60422
                      1 02 10 & 1 03 10 & 1 04 10 )(                      LV-60423
9'S WITH NS UP LFT    0 06 11 & 0 08 11 )(                                LV-60424
                      0 06 05 &                                           LV-60425
                      0 04 01 . 0 06 01 . 0 08 01 . 0 09 01 .             LV-60426
N'S                   0 02 01 . 0 03 01 . 0 10 01 . 0 11 01 )(            LV-60427
B1                    0 06 02 . 0 06 03 . 0 06 04 )                       LV-60428
* FOUR 2                                                                  LV-60429
R402 BL               1 10 11 & 1 09 11 )(                                LV-60430
T1                    1 03 11 & 1 04 11 )(                                LV-60431
T1                    1 02 14 & 1 03 14 & 1 04 14 )(                      LV-60432
K                     1 09 07 & 1 10 08 )(                                LV-60433
B3                    1 10 04 & 1 11 04 & 1 09 04 )(                      LV-60434
B1                    0 02 05 . 0 03 05 . 0 04 05 )(                      LV-60435
M1                    1 04 07 & 1 04 08 )(                                LV-60436
M3                    0 11 10 . 0 11 11 . 0 11 12 )(                      LV-60437
M2                    1 06 07 & 1 06 08 )(                                LV-60438
T2                    0 05 12 . 0 06 13 . 0 05 14 . 0 06 15 . 0 06 16 )(  LV-60439
                      1 09 02 &                                           LV-60440
T1                    0 01 16 . 0 02 16 . 0 03 16 . 0 04 16 . 0 05 16 )(  LV-60441
9'S WITH NS UP LFT    0 06 11 & 0 08 11 )(                                LV-60442
B1                    0 06 02 . 0 06 03 . 0 06 04 . 0 06 05 )(            LV-60443
FOR N'S               1 03 07 & 0 06 05 .                                 LV-60444
                      0 04 01 . 0 06 01 . 0 08 01 . 0 09 01 .             LV-60445
N'S                   0 02 01 . 0 03 01 . 0 10 01 . 0 11 01 )             LV-60446
* FIVE 1                                                                  LV-60447
R501 BL               1 09 07 & 1 10 07 & 1 11 07 )(                      LV-60448
T1                    1 03 14 & 1 04 14 )(                                LV-60449
K                     0 06 11 & 1 09 10 & 0 08 06 )(                      LV-60450
M1                    1 04 11 & 1 04 10 )(                                LV-60451
B1                    1 02 03 & 1 02 04 & 1 02 05 )(                      LV-60452
                      0 03 07 . 0 04 07 )(0 05 07 )(                      LV-60453
M2                    1 06 09 & 1 06 10 )(                                LV-60454
T3                    1 09 15 & 1 09 16 )(                                LV-60455
T3                    0 08 13 . 0 09 13 . 0 10 13 . 0 11 13 )(            LV-60456
M1                    0 02 07 . 0 02 08 . 0 02 09 )(                      LV-60457
V                     0 02 10 . 0 02 11 . 0 02 12 . 0 02 13 . 0 02 14 .   LV-60458
                      0 02 15 )(                                          LV-60459
M1                    1 06 03 & 1 06 04 & 1 06 05 )(                      LV-60460
K BETWEEN PACKET      0 LT 01 & 0 LT 04 & 1 03 04 &                       LV-60461
                      0 12 14 . 0 12 15 . 0 12 16 )(0 06 07 )(            LV-60462
OPEN 8'S & 4'S        0 04 05 . 0 06 05 & 1 11 15 . 1 09 04 )(            LV-60463
M1                    1 03 12 & 1 04 12 )                                 LV-60464
* FIVE 2                                                                  LV-60465
R502 BL               1 09 07 & 1 10 07 & 1 11 07 )(                      LV-60466
T1                    1 03 14 & 1 04 14 )(                                LV-60467
```

IBM 37

```
                        1  1  8 & 1  4  9 & 1  6 10 . 0  3 14 . 0 10 14 .   LV-6031
C4R8-9                  0  3  1 )(                                           LV-6031
                        1  0  7 & 1  9  8 )(                                 LV-6031
 9R7-8                  1  2  3 & 1  3  3 & 1  2  4 )(                       LV-6031
C2-3R3                  1 10  3 & 1 11  3 & 1 11  4 )(                       LV-6031
C10-11R3                0  8  1 . 0  8  2 .    8  3 . 0  8  4 & 0  4  2 .    LV-6031
C8R1-4C4R1-4            0  4  1 . 0  4  3 . 0  4  4 )(                       LV-6031
                        1  8 10 & 1  8 11 & 1  8  9 )(                       LV-6031
C8R10-11                1  6 11 & 1  6 12 )(                                 LV-6032
C5R11-12                0  3  1 . 0  2  1 & 0  9  1 . 0 10  1 . 0 11  1 )(   LV-6032
C3-2R1C9-10R1           0 LT 04 & 1  2  3 . 1  2  4 )(                       LV-6032
STOP-N                  0 LT C4 & 0 LT 01 & 1  2  3 . 1  2  4 & 1 10  3 .    LV-6032
C2R3-4C10R3-4           1 10  4 )(                                           LV-6032
                        0 11 11 . 0 11 12 & 1  4  8 & 1  4  9 )(             LV-6032
C11C8R10-12             1 LT 81 )(                                           LV-6032
WHTBUT                  0  6  1 . 0  6  2 . 0  6  3 . 0  6  4 )              LV-6032
C6R1-4                                                                       LV-6032
* CHARACTER  >          0  2  9 . 0  3  9 . 0  4  9 )(                       LV-6032
R>01 BL C2-4R8          0  2 16 . 0  3 16 . 0  4 16 )(                       LV-6033
C2-4R16                 1  3  4 & 1  3  5 )(                                 LV-6033
C3R3-4                  1  3 13 & 1  3 14 )(                                 LV-6033
C3R12-13                1  6  6 & 1  6  7 )(                                 LV-6033
C6R5-6                  1  6 11 & 1  6 12 )(                                 LV-6033
C6R10-11                1 10  7 & 1 10  8 )(                                 LV-6033
C10R6-7                 1 10  9 & 1 10 10 )(                                 LV-6033
C10R8-9                 0  5 15 . 0  6 16 . 0  5  2 . 0  6  3 )(             LV-6033
C6R3-4R13--14           0  8 14 . 0  9 14 )(                                 LV-6033
C8-9R12                 0 10 13 . 0 11 13 )(                                 LV-6033
C10-11                  0 10  5 . 0 11  5 )(                                 LV-6034
C10-11R5                1  8 10 & 1  8 11 )(                                 LV-6034
C8R9-10                 1  8  7 & 1  8  8 )(                                 LV-6034
C8R6-7                  0  2  1 . 0  3  1 . 0  4  1 )(                       LV-6034
STOP-2                  0 LT 01 & 1 11  8 . 1 11  9 )(                       LV-6034
LFTWHT                  0  8  4 . 0  9  4 )                                  LV-6034
C8-9R4                                                                       LV-6034
* ZERO 1                                                                     LV-6034
R001 BL                 1 10 11 & 1 11 11 )(                                 LV-6034
B1                      1 03 03 & 1 04 02 )(                                 LV-6034
K                       1 06 13 & 1 06 14 & 1 06 15 & 1 05 14 & 1 07 15 )(   LV-6035
                        1 09 02 & 1 10 03 )(                                 LV-6035
M1                      1 02 11 & 1 03 11 )(                                 LV-6035
M2                      0 06 07 . 0 06 08 . 0 06 09 . 0 06 10 . 0 06 11 .    LV-6035
                        0 06 12 )(                                           LV-6035
B2                      1 06 01 & 1 06 02 & 1 06 03 )(                       LV-6035
M1                      1 02 05 & 1 03 06 )(                                 LV-6035
M3                      1 10 06 & 1 11 06 )(                                 LV-6035
T1                      1 04 13 & 1 04 14 & 1 04 15 )(                       LV-6035
T3                      1 08 14 & 1 08 15 & 1 05 13 )(                       LV-603
HEAVY C'S NOT D         1 10 04 . 1 10 12 . 1 02 08 . 0 04 09 &              LV-603
                        0 08 05 . 0 08 12 .                                  LV-603
M3                      0 08 07 . 0 08 08 . 0 08 09 . 0 08 10 . 0 08 11 )    LV-603
* ONE 1                                                                      LV-603
R101 BL                 1 05 02 & 1 05 03 )(                                 LV-603
                        1 06 11 & 1 07 12 & 1 08 12 )(                       LV-603
T1                      1 03 13 & 1 03 14 & 1 03 15 )(                       LV-603
M1                      0 03 06 . 0 03 07 . 0 03 08 . 0 03 09 . 0 03 10 )(   LV-603
B1                      1 03 01 & 1 03 02 & 1 03 03 )(                       LV-603
B3                      1 10 05 & 1 11 05 & 1 09 05 )(                       LV-603
T3                      0 09 11 . 0 09 12 . 0 09 13 . 0 10 14 . 0 10 15 .    LV-603
                        0 10 15 . 0 10 12 . 0 10 13 )(                       LV-603
BETA PACK O'S.          1 09 01 & 1 09 02 & 1 09 03 )(                       LV-603
B2                      1 06 05 & 1 06 06 )(                                 LV-603
HEAVY ROTATED CCW       1 11 03 & 0 01 14 . 0 01 15 . 0 01 16 .              LV-603
BETW PACK O'S           0 01 13 & 0 LT 01 & 0 08 07 . 0 08 08 . 0 08 09 )(   LV-603
HEAVY ROTATED CCW       1 01 14 &                                            LV-603
6'S                     1 02 03 & 0 LT 04 & 1 02 02 )(                       LV-603
T3                      0 10 10 . 0 11 10 )(                                 LV-603
T1                      0 02 11 . 0 03 11 )(                                 LV-603
T1                      1 04 13 & 1 04 14 & 1 04 15 )                        LV-603
* TWO 1                                                                      LV-603
R201 BL                 1 06 01 & 1 06 02 & 1 05 03 )(                       LV-603
T1                      1 04 13 & 1 04 14 & 1 04 15 )(                       LV-603
M3                      1 10 11 & 1 11 11 )(                                 LV-603
K2                      0 05 05 . 0 06 11 )(                                 LV-603
B3                      1 09 01 & 1 09 02 & 1 09 03 )(                       LV-603
M2                      1 05 07 & 1 06 08 & 1 05 09 )(                       LV-603
B1                      1 02 04 & 1 03 04 )(                                 LV-603
T1                      0 03 11 . 0 03 11 . 0 04 11 )(                       LV-603
T3                      1 08 13 & 1 08 14 & 1 08 15 )(                       LV-603
```

IBM 37

```
                          1  5  2  1  6  2 & 1  7  2 )(                             LV-60234
C5-7R5                    1  5  5  1  6  5 & 1  7  5 )                              LV-60235
* CHARACTER  /                                                                      LV-60236
R/01 BL C2-4R4            1  2  3  1  3  3 & 1  4  3 )(                             LV-60237
C9-11R14                  1  9 14 & 1 10 14 & 1 11 14 )(                            LV-60238
C6R1-3                    0  6  1 . 0  6  2 . 0  6  3 )(                            LV-60239
C6R13-16                  0  6 13 . 0  6 14 . 0  6 15 . 0  6 16 )(                  LV-60240
C2-3R8C10-11R8            0  2  8 . 0  3  8 . 0 10  8 . 0 11  8 . 0 11  7 )(        LV-60241
C9R3-5                    0  9  3 . 0  9  4 . 0  9  5 )(                            LV-60242
C2R6-7                    0  2  6 . 0  2  7 )(                                      LV-60243
C6R7-9                    1  6  7 & 1  6  8 & 1  6  9 )(                            LV-60244
STOP-Y                    0  3 11 . 0  2 11 )(                                      LV-60245
STOP-X                    1 10 12 & 1 10 13 & 0 LT 01 )(                            LV-60246
C4R4-6                    1  4  4 & 1  4  5 & 1  4  6 )(                            LV-60247
C8R9-11                   1  8  9 & 1  8 10 & 1  8 11 )(                            LV-60248
STOP-7                    0  9 16 . 0 10 16 . 0 11 16 & 0 LT 02 )(                  LV-60249
C3R2-4                    1  3  2 & 1  3  3 & 1  3  4 &                             LV-60250
C10R12-14                 1 10 12 & 1 10 13 & 1 10 14 )(                            LV-60251
C9R11-13                  1  9 11 & 1  9 12 & 1  9 13 )(                            LV-60252
STOP-7                    0  9 16 . 0 10 16 . 0 11 16 & 1  3  2 & 1  3  3 &         LV-60253
                          1  3  4 )(                                                LV-60254
C6-8R12-10                0  6 12 & 1  8 10 )(                                      LV-60255
STOP-0                    0  3  1 . 0  4  1 & 1  2  2 & 1  2  3 & 0 LT 04 )(        LV-60256
C4R11-16                  0  4 11 . 0  4 12 . 0  4 13 . 0  4 14 . 0  4 15 .         LV-60257
                          0  4 16 )                                                 LV-60258
*  SYMBOL  "                                                                        LV-60259
R"01 BL C3-4R10           1  3 10 & 1  4 10 )(                                      LV-60260
                          1 LT 07 )(                                                LV-60261
C2-4R6                    0  2  6 . 0  3  6 . 0  4  6 & 0  2  5 . 0  3  5 .         LV-60262
                          0  4  5 )(                                                LV-60263
C9-11R5R6                 0  9  6 . 0 10  6 . 0 11  6 & 0  9  5 . 0 10  5 . 0       LV-60264
                          0 11  5 )(                                                LV-60265
C3R11-13                  1  3 11 & 1  3 12 & 1  3 13 )(                            LV-60266
C6R12-13                  1  6 12 & 1  6 13 )(                                      LV-60267
C10R11-13                 1 10 11 & 1 10 12 & 1 10 13 )(                            LV-60268
C9-10R10                  1  9 10 & 1 10 10 )(                                      LV-60269
C6R1-2                    0  6  1 . 0  6  2 )(                                      LV-60270
C6R8-10                   0  6  8 . 0  6  9 . 0  6 10 )(                            LV-60271
STOP-5                    0  2 16 . 0  3 16 )(                                      LV-60272
C3-4R9                    1  3  9 & 1  4  9 )(                                      LV-60273
C9-10R9                   1  9  9 & 1 10  9 )(                                      LV-60274
                          1 [illegible] 11 . 0  7 14 )(                             LV-60275
STOP-BETWEEN              1  8 11 & 1  8 12 & 1  8 13 )(                            LV-60276
C2-11R4                   0  2  4 . 0  3  4 . 0  4  4 . 0  6  4 . 0  8  4 .         LV-60277
                          0  9  4 . 0 10  4 . 0 11  4 )(                            LV-60278
STOP-BETWEEN              0 CM 05 )(                                                LV-60279
C6R7-95-7                 0  6  5 . 0  5  6 . 0  6  7 )                             LV-60280
* CHARACTER  N                                                                      LV-60281
RN01 BL C2-3R8            1  2  8 & 1  3  8 )(                                      LV-60282
C10-11R7                  1 10  7 & 1 11  7 )(                                      LV-60283
STOP-8                    1 10  8 & 1 11  8 & 0  8 11 )(                            LV-60284
C2-3R14                   1  2 14 & 1  3 14 )(                                      LV-60285
C10-11R14                 1 10 14 & 1 11 14 )(                                      LV-60286
C9R4-5                    1  9  4 & 1  9  5 )(                                      LV-60287
C10-11R4                  1 10  4 & 1 11  4 )(                                      LV-60288
C2-3R4                    1  2  4 & 1  3  4 )(                                      LV-60289
C6R2-4C4R2-4              0  6  2 . 0  6  3 . 0  6  4 & 0  4  2 . 0  4  3 .         LV-60290
                          0  4  4 )(                                                LV-60291
C3R5-6C8R6-7              1  3  5 . 1  3  6 & 1  8  6 . 1  8  7 & 1  8  4 .         LV-60292
                          1  8  5 )(                                                LV-60293
C8R12-16C9R12-16          0  8 12 . 0  8 13 . 0  8 14 . 0  8 15 . 0  8 16 &         LV-60294
                          0  9 12 . 0  9 13 . 0  9 14 . 0  9 15 . 0  9 16 &         LV-60295
                          0  6 12 . 0  6 13 . 0  6 14 . 0  6 15 . 0  6 16 )(        LV-60296
C7R7-8                    1  7  7 & 1  7  8 )(                                      LV-60297
C5R11-13                  1  5 12 & 1  5 13 & 1  5 11 )(                            LV-60298
C4R12-14                  1  4 12 & 1  4 13 & 1  4 14 )(                            LV-60299
C4C6R5-6                  0  4  5 . 0  4  6 & 0  6  5 . 0  6  6 & 1  3  2 &         LV-60300
                          1 11  2 & 1  4  2 & 1 10  2 )(                            LV-60301
STOP-M                    0  5  7 & 1  7  7 )(                                      LV-60302
C6R9-11                   1  6  9 & 1  6 10 & 1  6 11 )                             LV-60303
* CHARACTER  A                                                                      LV-60304
RA01 BL C6R5-6            1  6  5 . 1  6  6 & 1  6  6 . 1  4  6 . 1  8  6 &         LV-60305
                          1  6  5 . 1  4  5 . 1  8  5 )(                            LV-60306
C2R13-15                  0  2 13 . 0  2 14 . 0  2 15 )(                            LV-60307
C11R13-15                 0 11 13 . 0 11 14 . 0 11 15 )(                            LV-60308
C8R5-6                    1  8  5 & 1  8  6 )(                                      LV-60309
C4-8R14                   1  4 14 & 1  6 14 & 1  8 14 )(                            LV-60310
C4R5-6                    1  4  5 & 1  4  6 )(                                      LV-60311
```

```
C10-11R8          1 10  8 & 1 11  8 )                                      LV-60156
* CHARACTER  U                                                              LV-60157
RU01 BL C6R13-16  0  6 13 . 0  6 14 . 0  6 15 . 0  6 16 . 0  6 12 )(       LV-60158
C4R2-3            1  4  2 & 1  4  3 )(                                     LV-60159
C8R2-3            1  8  2 & 1  8  3 )(                                     LV-60160
C10-11R4          1 10  4 & 1 11  4 )(                                     LV-60161
C10-11R13         1 10 13 & 1 11 13 )(                                     LV-60162
C2-3R13           1  2 13 & 1  3 13 )(                                     LV-60163
C2-3R4            1  2  4 & 1  3  4 )(                                     LV-60164
C2-3R9            1  2  9 & 1  3  9 )(                                     LV-60165
C6R2-3            1  6  2 & 1  6  3 )(                                     LV-60166
C6R8-9            0  6  8 . 0  6  9 . 0  6  7 )(                           LV-60167
C7R8-9C5R8-9      0  7  8 . 0  7  9 . 0  5  8 . 0  5  9 )(                 LV-60168
C8R13-16C4R13-16  0  8 13 . 0  8 14 . 0  8 15 . 0  8 16 . 0  8 12 &        LV-60169
C4R12-16          0  4 14 . 0  4 15 . 0  4 16 . 0  4 13 . 0  4 12 )(       LV-60170
STOP-0            0  5 13 . 0  5 14 . 0  5 15 . 0  5 16 & 0  7 13 .        LV-60171
                  0  7 14 . 0  7 15 . 0  7 16 )(                           LV-60172
C4R8-9C8R8-9      0  4  8 . 0  4  9 & 0  8  8 . 0  8  9 )(                 LV-60173
C10R2-3C6R5-6     1  9  2 & 1  9  3 & 0  6  5 . 0  6  6 )(                 LV-60174
C10-11R8          1 10  8 & 1 11  8 )                                      LV-60175
* CHARACTER  $                                                              LV-60176
R$01 BL C3C10R2-3 0  3  2 . 0  3  3 . 0 10  2 . 0 10  3 )(                 LV-60177
C3C10R14-15       0  3 14 . 0  3 15 . 0 10 14 . 0 10 15 )(                 LV-60178
C5-7R16           0  5 16 . 0  6 16 . 0  7 16 & 1 CM $2 )(                 LV-60179
C3R11-12          1  3 11 & 1  3 12 )(                                     LV-60180
C3R5-6            1  3  5 & 1  3  6 & 1  4  5 & 1  4  6 )(                 LV-60181
C10R11-12         1 10 11 & 1 10 12 & 1  9 11 & 1  9 12 )(                 LV-60182
C10R5-6           1 10  5 & 1 10  6 )(                                     LV-60183
BOTTOP            1 CM $1 & 1 CM $2 )(                                     LV-60184
MID               1  6  8 & 1  6  9 )(                                     LV-60185
BOT               1 CM $2 & 0  2  7 . 0  3  7 . 0  4  7 . 0  6  7 )(       LV-60186
TOP               1 CM $1 & 0  6 10 . 0  8 10 . 0  9 10 . 0 10 10 .        LV-60187
                  0 11 10 . 0 11  4 )(                                     LV-60188
STP-8             0  4 14 . 0  9  3 & 0  4  3 . 0  9 14 )(                 LV-60189
C6R5-6            1  6  5 & 1  6  6 )(                                     LV-60190
C6R11-12          1  6 11 & 1  6 12 )(                                     LV-60191
C8R5-6            1  8  5 & 1  8  6 )(                                     LV-60192
C8R11-12          1  8 11 & 1  8 12 )(                                     LV-60193
C10R8-9           1 10  8 & 1 10  9 )(                                     LV-60194
C3R8-9            1  3  8 & 1  3  9 )                                      LV-60195
* CHARACTER  X                                                              LV-60196
RX01 BL C2-4R4    1  2  4 & 1  3  4 & 1  4  4 )(                           LV-60197
C9-11R4           1  9  4 & 1 10  4 & 1 11  4 )(                           LV-60198
C2-4R13           1  2 13 & 1  3 13 & 1  4 13 )(                           LV-60199
C9-11R13          1  9 13 & 1 10 13 & 1 11 13 & 1  8 13 )(                 LV-60200
C2-3R8C10-11R8    0  2  8 . 0  3  8 . 0 10  8 . 0 11  8 )(                 LV-60201
C6R1-4            0  6  1 . 0  6  2 . 0  6  3 . 0  6  4 & 0  7  1 .        LV-60202
                  0  7  2 . 0  7  3 . 0  7  4 )(                           LV-6020
C6R13-16          0  6 13 . 0  6 14 . 0  6 15 . 0  6 16 & 0  8 13 .        LV-60204
                  0  7 14 . 0  8 15 . 0  8 16 )(                           LV-60205
STOP-R            0  4  8 & 0  8 13 . 0  8 14 & 1  2 14 )(                 LV-60206
C3-5R6            1  3  6 & 1  4  6 & 1  5  6 )(                           LV-60207
C8-10R6           1  8  6 & 1  9  6 & 1 10  6 & 1  8  5 )(                 LV-60208
C3-5R11           1  3 11 & 1  4 11 & 1  5 11 )(                           LV-60209
C8-10R11          1  8 11 & 1  9 11 & 1 10 11 )(                           LV-60210
N-STOP1           0  4  8 & 1  6  8 . 1  7  8 . 1  3  4 )(                 LV-60211
N-STOP2           0  9  5 & 1  6  8 . 1  7  8 . 1 10 13 )(                 LV-60212
STOP-C            0  6 12 & 0  8 12 & 1  7  8 )(                           LV-60213
C6R8-9            1  6  8 & 1  6  9 )                                      LV-60214
* CHARACTER  Y                                                              LV-60215
RY01 BL C2-3R14   1  2 14 & 1  3 14 & 1  2 13 )(                           LV-60216
C10-11R14         1 10 14 & 1 11 14 & 1 11 13 )(                           LV-60217
STOP-X            0  3  3 & 0  9  3 )(                                     LV-60218
C6R13-16          0  6 13 . 0  6 14 . 0  6 15 . 0  6 16 )(                 LV-60219
C2-3C10-11R8      0  2  8 . 0  3  8 . 0 10  8 . 0 11  8 . 0  9  8 )(       LV-60220
C10R2-6           0 10  2 . 0 10  3 . 0 10  4 . 0 10  5 . 0 10  6 .        LV-6022
                  0 10  1 )(                                               LV-6022
C4R10-12          1  4 11 & 1  4 12 & 1  4 10 )(                           LV-6022
C8R10-12          1  8 11 & 1  8 12 & 1  8 10 )(                           LV-6022
C5-7R4            1  5  3 & 1  6  3 & 1  7  3 & 1  4  3 & 1  8  3 )(       LV-6022
C2R3-5            0  2  3 . 0  2  4 . 0  2  5 . 0  2  2 . 0  2  1 )(       LV-6022
C10R12-14         1 10 12 & 1 10 13 & 1 10 14 )(                           LV-6022
R-M-STOP          0  4  8 & 1  6  8 )(                                     LV-6022
STOP-6            0  8  9 & 1  5  8 & 0  3 15 )(                           LV-6022
C6R9-10           1  6  9 & 1  6 10 )(                                     LV-6023
C5-7R7            1  5  7 & 1  6  7 & 1  7  7 )(                           LV-6023
C2-4R16           0  2 16 . 0  3 16 . 0  4 16 &                            LV-6023
C9-11R16          0  9 16 . 0 10 16 . 0 11 16 &                            LV-6023
```

IBM 37

```
C6R2-5C8R2-5          0  6  1 . 0  6  2 . 0  6  3 . 0  6  4 . 0  6  5 &    LV-60078
                      0  8  3 . 0  8  4 . 0  8  5 . 0  8  2 . 0  8  1 )(   LV-60079
C4R14-15              1  4 14 & 1  4 15 )(                                  LV-60080
C10-11R8C10-11R9      0 10  8 . 0 11  8 & 0 10  9 . 0 11  9 )(             LV-60081
C6C8C11R12R3-4        0  6 12 . 0  8 12 & 1 11  3 & 1 11  4 )(             LV-60082
EAT-X                 0  6 12 . 0  8 12 & 1  2  9 & 1  3  9 )(             LV-60083
C10-11R12             1 10 12 & 1 11 12 )                                   LV-60084
* CHARACTER  C                                                              LV-60085
RC01 BL C8R14-15      1  8 14 & 1  8 15 )(                                  LV-60086
C9R14-15              1  9 14 & 1  9 15 )(                                  LV-60087
C8R2-3                1  8  2 & 1  8  3 )(                                  LV-60088
C9R2-3                1  9  2 & 1  9  3 )(                                  LV-60089
C2R3-4                0  2  3 . 0  2  4 )(                                  LV-60090
C2R13-14              0  2 13 . 0  2 14 )(                                  LV-60091
C4R11-12              1  4 11 & 1  4 12 )(                                  LV-60092
C11R6-10              0 11  6 . 0 11  7 . 0 11  8 . 0 11  9 . 0 11 10 )(   LV-60093
C8R6-10               0  8  6 . 0  8  7 . 0  8  8 . 0  8  9 . 0  8 10 )(   LV-60094
C3R6-7                1  3  6 & 1  3  7 & 0  3  5 . 0  4  4 . 1  6  4 )(   LV-60095
C3R10-11              1  3 10 & 1  3 11 & 0  3 12 . 0  4 13 . 1  6 13 )(   LV-60096
C2C3R8-9              1  2  8 & 1  2  9 & 1  3  8 & 1  3  9 )(             LV-60097
C2R8-9                1  2  8 . 1  2  9 & 0  3  4 . 0  4  3 . 0  3 13 .    LV-60098
                      0  4 14 )(                                            LV-60099
C6R7-9                0  6  7 . 0  6  9 & 1  5 10 . 1  6  6 )(             LV-60100
STOP-0                0  6  8 )(                                            LV-60101
C4R5-6                1  4  5 & 1  4  6 )                                   LV-60102
* CHARACTER  D                                                              LV-60103
RD01 BL C6R14-15      1  6 14 & 1  6 15 )(                                  LV-60104
C6R2-3                1  6  2 & 1  6  3 )(                                  LV-60105
C10-11R9              1 10  9 & 1 11  9 )(                                  LV-60106
C10-11R3R14           0 10  3 . 0 11  3 . 0 10 14 . 0 11 14 )(             LV-60107
C3R2-3                1  3  2 & 1  3  3 )(                                  LV-60108
C6R7-10C8R7-10        0  6  7 . 0  6  8 . 0  6  9 . 0  6 10 & 0  8  7 .    LV-60109
                      0  8  8 . 0  8  9 . 0  8 10 & 0  7  7 . 0  7  8 .    LV-60110
                      0  7  9 . 0  7 10 )(                                  LV-60111
C4R8-9                1  4  8 & 1  4  9 )(                                  LV-60112
C2R5-6R11-12          0  2  5 . 0  2  6 & 0  2 11 . 0  2 12 )(             LV-60113
C9R5-6                1  9  5 & 1  9  6 )(                                  LV-60114
C9R11-12              1  9 11 & 1  9 12 )(                                  LV-60115
C3-4R5R11             1  3  5 & 1  4  5 & 1  3 11 & 1  4 11 )(             LV-60116
STOP-6                0  3 16 . 0  4 16 & 0  2  5 . 0  2  6 )(             LV-60117
C3R14-15              1  3 14 & 1  3 15 )                                   LV-60118
* CHARACTER  P                                                              LV-60119
RP01 BL C2-4R4        1  2  3 & 1  3  3 & 1  4  3 )(                        LV-60120
C2-3R11               1  2 11 & 1  3 11 )(                                  LV-60121
C10-11R11             1 10 11 & 1 11 11 )(                                  LV-60122
C6R14-15              1  6 14 & 1  6 15 )(                                  LV-60123
C8R7-8                1  8  7 & 1  8  8 )(                                  LV-60124
C10R7-8               1 10  7 & 1 10  8 )(                                  LV-60125
C10R1-4               0 10  1 . 0 10  2 . 0 10  3 . 0 10  4 )(             LV-60126
C9R14-15              1  9 14 & 1  9 15 )(                                  LV-60127
C8-9R4                0  8  4 . 0  9  4 )(                                  LV-60128
C2-3R9                1  2  9 & 1  3  9 )(                                  LV-60129
C6R11-12C8R11-12      0  6 11 . 0  6 12 & 0  8 11 . 0  8 12 )(             LV-60130
C6R7-8                1  6  7 & 1  6  8 )(                                  LV-60131
R-STOP                0  8  3 . 0  8  2 . 0  8  1 )(                        LV-60132
C2-4R6                1  2  6 & 1  3  6 & 1  4  6 )(                        LV-60133
C2-4R13               1  2 13 & 1  3 13 & 1  4 13 )(                        LV-60134
C8-11R5               0  8  5 . 0  8  5 . 0  9  5 . 0 10  5 . 0 11  5 )    LV-60135
* CHARACTER  M                                                              LV-60136
RM01 BL C2-3R3        1  2  3 & 1  3  3 )(                                  LV-60137
C2-3R12               1  2 12 & 1  3 12 )(                                  LV-60138
C10-11R13             1 10 13 & 1 11 13 )(                                  LV-60139
C6R10-11C7R10-11      1  6 10 . 1  6 11 & 1  7 10 . 1  7 11 )(             LV-60140
STOP-0                1  2 14 & 1  3 14 & 1 10 14 & 1 11 14 & 0  6 12 .    LV-60141
                      0  7 12 )(                                            LV-60142
C6R5-6                0  6  5 . 0  6  6 )(                                  LV-60143
C6-8R16               0  6 16 & 0  8 16 )(                                  LV-60144
C6R14-15C8R14-15      0  6 14 . 0  6 15 & 0  8 14 . 0  8 15 & 1  2 14 .    LV-60145
                      1 11 14 )(                                            LV-60146
C9-11R4               1 10  4 & 1 11  4 & 1  9  4 )(                        LV-60147
C9R3-6C6-8R8          0  9  3 . 0  9  4 . 0  9  5 . 0  9  6 & 0  6  8 .    LV-60148
                      0  7  8 & 0  6  9 . 0  7  9 . 0  8  9 )(             LV-60149
C2-3R8                1  2  8 & 1  3  8 )(                                  LV-60150
C8R11-15              1  8 11 & 1  8 12 & 1  8 13 & 1  8 14 & 1  8 15 )(   LV-60151
C9R12-13              1  9 12 & 1  9 13 )(                                  LV-60152
C4R12-13              1  4 12 & 1  4 13 )(                                  LV-60153
C6R1-3                0  6  1 . 0  6  2 . 0  6  3 . 0  6  4 )(             LV-60154
C10-11R10             1 10 10 & 1 11 10 )(                                  LV-60155
```

```
 11    C   12   30    5    6  12   30    C 200
CM01                        1 01 15   1 02 15 & 1 01 16 . 1 02 15 & 1 01 15 .   LV-600
                            1 02 15                                              LV-600
CM02                        1 02 15   1 03 15 & 1 02 16 . 1 03 15 & 1 02 15 .   LV-600
                            1 03 15 )                                            LV-600
CM03                        1 10 15 . 1 11 15 & 1 10 16 . 1 11 15 & 1 10 15 .   LV-600
                            1 11 16 )                                            LV-600
CM04                        1 11 15 . 1 12 15 & 1 11 16 . 1 12 15 & 1 11 15 .   LV-600
                            1 12 15 )                                            LV-600
CM05                        0 03 13 . 0 04 13 . 0 05 13 . 0 08 13 . 0 09 13 .   LV-600
                            0 10 13 . 0 02 13 . 0 11 13 )                        LV-6001
CM11                        0 11 14 . 0 02 14 . 0 03 14 . 0 04 14 . 0 05 14 .   LV-6001
                            0 06 14 . 0 10 14 . 0 08 14 . 0 09 14 )              LV-6001
CM12                        0 01 15 . 0 02 15 . 0 03 15 . 0 04 15 . 0 05 15 .   LV-6001
                            0 06 15 . 0 07 15 . 0 08 15 . 0 09 15 . 0 10 15 .   LV-6001
                            0 11 15 . 0 12 15 )                                  LV-6001
CM09                        1 CM 05 . 1 CM 12 )                                  LV-6001
CM06                        1 CM 09 . 0 11 14 . 0 11 16 )                        LV-6001
CM07                        1 CM 09 . 0 02 14 . 0 02 16 )                        LV-6001
LT01                        1 CM 01 R 1 CM 07 )                                  LV-6001
LT02                        1 CM 02 R 1 CM 07 )                                  LV-6002
LT03                        1 CM 03 R 1 CM 06 )                                  LV-6002
LT04                        1 CM 04 R 1 CM 06 )                                  LV-6002
CM08                        1 04 15 )(1 05 14 & 1 05 15 & 1 05 16 )              LV-6002
LT05                        1 CM 08 R 1 CM 09 )                                  LV-6002
CM10                        1 09 15 )(1 08 14 & 1 08 15 & 1 08 16 )              LV-6002
LT06                        1 CM 10 R 1 CM 09 )                                  LV-6002
ENDL                                                                             LV-6002
CMB1                        1  4 14 & 1  6 14 & 1  8 14 )                        LV-6002
CMB2                        1  4  3 & 1  6  3 & 1  8  3 )                        LV-6002
CMB1                        0  2  6 . 0  3  6 . 0  4  6 . 0  6  6 . 0  8  6 .   LV-6003
                            0  9  6 . 0 10  6 . 0 11  6 )                        LV-6003
LTS1                        1 CM B1 )                                            SLV-6003
CM32                        0  2 10 . 0  3 10 . 0  4 10 . 0  6 10 . 0  8 10 .   LV-6003
                            0  9 10 . 0 10 10 . 0 11 10 )                        LV-6003
CMST                        1 CM B1 . 1 CM B2 )                                  LV-6003
LT07                        1 CM ST )                                            LV-6003
LT11                        1 CM P1 )                                            LV-6003
CMVH                        1 02 04 & 1 03 04 & 1 04 04 & 1 06 04 & 1 08 04 &   LV-6003
FFR 9 BIT HIGH >            1 02 05 & 1 03 05 & 1 04 05 &                        LV-6003
                            1 09 04 & 1 10 04 & 1 11 04 & 1 02 03 & 1 11 03 )(  LV-6004
                            1 02 13 & 1 03 13 & 1 04 13 & 1 06 13 & 1 08 13 &   LV-6004
                            1 09 13 & 1 10 13 & 1 11 13 & 1 02 14 & 1 11 14 )(  LV-6004
IEM 37.                     1 02 09 & 1 03 09 & 1 04 09 & 1 06 09 & 1 08 09 &   LV-6004
                            1 09 09 & 1 10 09 & 1 11 09 )                        LV-6004
CLP1                        1 CM VH . 1 LT 05 )(1 CM 12 )(1 LT 06 )              LV-6004
CLS1                        1 CL P1 . 0 LT 01 )                                  LV-6004
CRP1                        1 CM VH . 1 LT 06 )(1 CM 12 )(1 LT 05 )              LV-6004
CRS1                        1 CR P1 . 0 LT 04 )                                  LV-6004
C.ML                        1 03 09 & 1 09 09 )(                                 LV-6004
                            1 CM B1 . 1 CM 11 . 1 CM 12 )(                       LV-6005
                            0 LT 01 . 0 LT 04 )(                                 LV-6005
                            1 06 08 . 1 06 10 . 1 08 08 . 1 08 10 &              LV-6005
                            1 04 08 . 1 04 10 . 1 06 08 . 1 06 10 )(             LV-6005
                            0 02 07 . 0 02 08 . 0 02 09 . 0 02 10 . 0 02 11 .   LV-6005
                            0 02 12 . 0 02 13 )(                                 LV-6005
FRM 9                       0 04 01 . 0 04 02 . 0 04 03 . 0 04 04 . 0 04 05 )(  LV-6005
FRM 9                       0 06 01 . 0 06 02 . 0 06 03 . 0 06 04 . 0 06 05 )(  LV-6005
FRM P                       0 10 01 . 0 10 02 . 0 10 03 . 0 10 04 )(             LV-6005
FRM R                       0 08 02 . 0 08 03 . 0 08 04 . 0 08 05 )(             LV-6005
                            0 11 07 . 0 11 08 . 0 11 09 . 0 11 10 . 0 11 11 .   LV-6006
                            0 11 12 . 0 11 13 . 0 11 01 )                        LV-6006
LTPM                        1 C. ML )                                            LV-6006
* PERIOD                                                                         LV-6006
R.01 PL                     1 LT PM . 1 CM 01 . 0 06 07 . 0 06 08 )              LV-6006
* CHARACTER R                                                                    LV-6006
R001 BL C6R14-15            1  6 14 & 1  6 15 )(                                 LV-6006
C6R9-10                     1  6  9 & 1  6 10 )(                                 LV-6006
C3R14-15                    1  3 14 & 1  3 15 )(                                 LV-6006
C8-10R6                     1  8  6 & 1  9  6 & 1 10  6 & 1  8  5 )(             LV-6006
C2-3R12                     1  2 12 & 1  3 12 )(                                 LV-6007
C9-10R4                     1  9  4 & 1 10  4 & 1 11  4 & 1  8  4 )(             LV-60071
C2-3R6                      1  2  6 & 1  3  6 )(                                 LV-6007
C8R14-15                    1  8 14 & 1  8 15 )(                                 LV-6007
C8R14-15                    1  8 14 & 1  8 15 )(                                 LV-6007
C4R9-10                     1  4  9 & 1  4 10 )(                                 LV-6007
C8R9-10C10R9-10             1  8  9 & 1  8 10 & 1 10  9 & 1 10 10 & 1 10 11 )(  LV-6007
C2-4R4                      1  2  4 & 1  3  4 & 1  4  4 )(                       LV-60077
```

TABLE II

BUFFER STORAGE ENTRY

```
START:    Read RL: go to LLINE or RLINE
LLINE:    Set ADDRESS = BUFFER
LNEXT:    Go to LDONE if EOL is on
          Go to LNEXT if STROBE is off
          Read CHAR into ADDRESS
          Increment ADDRESS
          Go to LNEXT
LDONE:    Set FIRST = BUFFER
          Set LAST = ADDRESS-1
          Go to END
RLINE:    Set ADDRESS=BUFFER+255
RNEXT:    Go to RDONE if EOL is on
          Go to RNEXT if STROBE is off
          Read CHAR into ADDRESS
          Go to RNEXT
RDONE:    Set FIRST = ADDRESS+1
          Set LAST = BUFFER+255
END:      Next instruction
```